United States Patent [19]
Brown

[11] Patent Number: 5,193,258
[45] Date of Patent: Mar. 16, 1993

[54] SELF-LOADING CONTROLLED DEFLECTION ROLL

[75] Inventor: Dale A. Brown, Milton, Wis.

[73] Assignee: Beloit Technologies, Inc., Wilmington, Del.

[21] Appl. No.: 792,558

[22] Filed: Nov. 15, 1991

[51] Int. Cl.⁵ .......................... B21B 13/02
[52] U.S. Cl. .......................... 492/7; 492/5; 492/46
[58] Field of Search ............ 29/116.1, 116.2, 115, 29/113.1, 113.2

[56] References Cited

U.S. PATENT DOCUMENTS

| | | | |
|---|---|---|---|
| Re. 32,586 | 2/1988 | Schiel et al. | 29/116.2 X |
| 3,286,325 | 11/1966 | Justus | 29/116.2 |
| 3,639,956 | 2/1972 | Justus | 29/116.2 |
| 4,440,077 | 4/1984 | Schiel | 29/113.2 X |
| 4,829,842 | 5/1989 | Schiel | 29/116.2 X |
| 4,850,088 | 7/1989 | Speak | 29/116.2 |
| 4,907,329 | 3/1990 | Boulot | 29/116.2 |
| 5,010,633 | 4/1991 | Brown et al. | 29/113.2 |
| 5,063,649 | 11/1991 | Wenzel et al. | 29/116.1 |

*Primary Examiner*—Mark Rosenbaum
*Assistant Examiner*—C. Richard Martin
*Attorney, Agent, or Firm*—Dirk J. Veneman; Raymond W. Campbell; Gerald A. Mathews

[57] ABSTRACT

A self-loading type of controlled deflection roll includes, in a preferred embodiment, a pivot assembly which is pivotally mounted to a support shaft near either end of the roll. The roll includes a roll shell having an extension attached to either end which extends coaxially outwardly from the roll shell. These axial extensions of the roll shell are supported by non-self-aligned bearings on the pivot assemblies near either end of the roll. Intermediate the end of the roll shell and the bearings is a heat barrier which prevents hot hydraulic fluid within the interior of the roll from contacting or heating the bearings which rotatably support the roll shell about the self-loading assembly. The bearings can, therefore, be provided with a lubricant which is sealed and shielded from the temperature of the hydraulic fluid within the roll.

8 Claims, 3 Drawing Sheets

SELF-LOADING CONTROLLED DEFLECTION ROLL

BACKGROUND OF THE INVENTION

1. Field of the Invention

This invention relates to a self-loading type of controlled deflection roll, such as used in the papermaking industry to provide at least one of a pair of nipped rolls to process a traveling web of paper. More particularly, this invention relates to a high temperature self-loading type of controlled deflection roll wherein the bearings on which the roll shell is rotatably mounted are shielded from the heat generated by the hydraulic fluid used to actuate one or more shoes within the roll to control the deflection of the roll shell. Still more particularly, this invention relates to a self-loading controlled deflection roll wherein the roll shell is pivotally mounted relative to the support shaft of the roll at either end of the roll at a point spaced outwardly from the end of the roll shell, and wherein the roll shell is supported on non-self-aligned bearings.

2. Description of the Prior Art

Controlled deflection rolls have been used in the papermaking industry for years to provide uniform nip loading between cooperating roll couples, at least one roll of which couple is such a controlled deflection roll, to process the paper web traveling in a papermaking machine. In the past few years, so-called self-loading controlled deflection rolls have been developed, particularly to be utilized in the press section of a papermaking machine, to provide roll loading, or nipping, engagement with a mating roll without the need for external arms to mount the roll and move it into and out of operating position. This saves considerable space and provides more flexibility in the design configuration.

As the speeds in papermaking machines have increased in order to provide a competitive paper product at competitive prices, the nip pressures required to dewater and otherwise process the ever-faster moving paper web have increased substantially. Further, the design of controlled deflection rolls has evolved into more sophisticated and versatile arrangements wherein the internal shoes which support and load the roll shell are individually controlled in both the axially and circumferentially extending directions relative to the internal surface of the roll shell. Such individual control includes different combinations of increased pressure over a greater segment of area of the internal surface of the roll shell, as well as greater pressures of the shoes against some segments of the annular inner surface area of the roll and lesser pressures against other inner surface areas of the roll shell. This has required the use of increased quantities of hydraulic fluid at increased pressures. Also, modern papermaking processes sometimes require a relatively high roll shell surface temperature. This, in turn, will result in the controlled deflection roll operating with its hydraulic fluid at a higher temperature. The temperatures of the hydraulic fluid used to actuate the shoes within the controlled deflection roll can reach about 400° F. In some applications, such as press drying where the traveling paper web is pressed and partially dried at the same operation when it is nipped between two rolls, such temperatures are not altogether undesirable.

However, it has been found that there is no lubricant available for use in a hydrostatically loaded support shoe which can withstand temperatures above about 400° F. for a prolonged period of time, such as is experienced in a papermaking machine which operates continuously for 24 hours a day, 7 days a week. In such applications, the lubricant possesses insufficient viscosity to properly maintain flow in order to lubricate the interface between the support shoe and the inner surface of the roll shell. In other words, the problem resides in providing sufficient pumping capacity, or otherwise maintaining sufficient lubricant flow at low viscosity.

Another problem resides in the fact that the ordinary ball or roller elements in bearings lose their hardness when operated at temperatures of about 400° F. over a period of time. This greatly reduces their life and results in undesirable and costly downtime in a papermaking machine. Papermakers have indicated that they will require controlled deflection rolls in the future having operating parameters which will require lubricants to withstand temperatures of about 600° F.

Various attempts to either solve or avoid the problem of providing adequate bearing lubrication while providing adequate viscosity to the roll shell deflection control support shoes have been promulgated in recent years, but no method has completely or adequately solved the problem, particularly while providing the desired operating flexibility desired by papermakers.

Thus, in Arav U.S. Pat. No. 4,821,384, a bearing-less design is disclosed which obviates the bearing softening problem by eliminating the bearings such that the rotating roll shell is supported and loaded into nipping engagement solely by a plurality of shoes disposed circumferentially about the support shaft. Other bearing-less designs for controlled deflection rolls have been devised, such as Crouse U.S. Pat. No. 4,852,229. The type of controlled deflection roll described in these patents has not yet been developed into a commercially acceptable product.

Other attempts to solve the problems associated with the break-down of the bearing lubricant in high-temperature controlled deflection rolls has involved the use of a liquid barrier seal between the interior cavity of the controlled deflection roll and the bearings rotatably supporting the roll shell. Such an arrangement is described in Pav et al U.S. Pat. No. 4,757,584.

To summarize the prior art, the bearings in a self-loading type of controlled deflection roll have either remained exposed to unacceptable high temperatures, or have been eliminated entirely, or the controlled deflection roll has not been able to be configured into the desired self-loading type of roll.

SUMMARY OF THE INVENTION

This invention provides a controlled deflection roll which includes a combination of roll structure and operating features and capabilities which heretofore have been unavailable. This invention provides a self-loading type of controlled deflection roll wherein the roll shell is rotatably mounted by non-self-aligned bearings which are shielded from the hot hydraulic fluid used to actuate the controlled deflection roll and from the heat generated by the hot hydraulic fluid. In addition, the roll shell, in a preferred embodiment, is translationally moved by a pivot assembly which is pivotally attached to the support shaft of the roll beneath the location of the bearings which rotatably support the roll shell. Such direct attachment of the pivot assembly to the support shaft provides better dimensional control of the alignment between the shell and the support shaft than an external pivot type of design which is mounted to the support shaft mounting stand and is encumbered by a much greater distance than the support shaft and the fact that it of necessity utilizes more interconnecting parts.

In the papermaking art, it is important in rolls which operate at elevated temperature, such as controlled deflection rolls, that the thickness of the roll shell either remain constant for its entire effective face width, which is the width of the roll shell contacted by the paper web, or that the roll shell remain at a constant temperature for its entire effective face width, or both conditions. This is to ensure that no discontinuities are caused by differences in roll shell temperature.

In this invention, the roll shell is provided with an extension piece at either end which takes the form of a hollow cylinder co-axially mounted to either end of the roll shell. Beneath the extension piece at either end of the roll is a heat barrier means which physically prevents hydraulic fluid which has been introduced into the interior of the controlled deflection roll to actuate the shoe, or shoes, used to control the deflection of the roll shell relative to the support shaft and become heated to high temperatures from moving axially outwardly from a location approximately immediately beneath the ends of the roll shell.

By locating the roll shell support bearings on a bearing ring which, in turn, is pivotally attached to the support shaft, and which is located axially outwardly relative to the heat shield and liquid barrier, the bearings are also shielded from the extreme temperatures which would otherwise break down the lubricant used to lubricate the roll shell support bearings. These support bearings are of the non-self-aligning type so that the roll shell is fixedly mounted in a bearing housing to prevent relative skewing movement of the roll shell and bearing housing about the axis of rotation. The bearing housing is, in turn, mounted to the bearing ring with a spherical bushing such that deflection of the support shaft is not translated to the roll shell through the pivotal mounting of the bearing ring on the support shaft.

Accordingly, it is an object of this invention to provide a self-loading type of controlled deflection roll having a roll shell rotatably mounted on bearings which, in turn, are mounted to move translationally relative to the support shaft and which are shielded from the heat of the interior of the roll.

Another object of this invention is to provide a self-loading type of controlled deflection roll for high temperature applications in a papermaking machine.

Still another object of this invention is to provide a self-loading type of controlled deflection roll wherein the self-loading apparatus is located axially outside of the ends of the roll shell.

A feature and advantage of this invention is the provision of bearings in a self-loading type of controlled deflection roll wherein the bearings are mounted radially outside of the pivotal attachment of the roll shell about the support shaft.

An object, feature and advantage of this invention is to provide a high temperature, self-loading type of controlled deflection roll wherein the roll shell is mounted in a bearing housing by non-self-aligned bearings.

These, and other objects, features and advantages of this invention will become more readily apparent to those skilled in the art upon reading the description of the preferred embodiment in conjunction with the attached drawings.

DESCRIPTION OF THE PREFERRED EMBODIMENT

Figure 1:
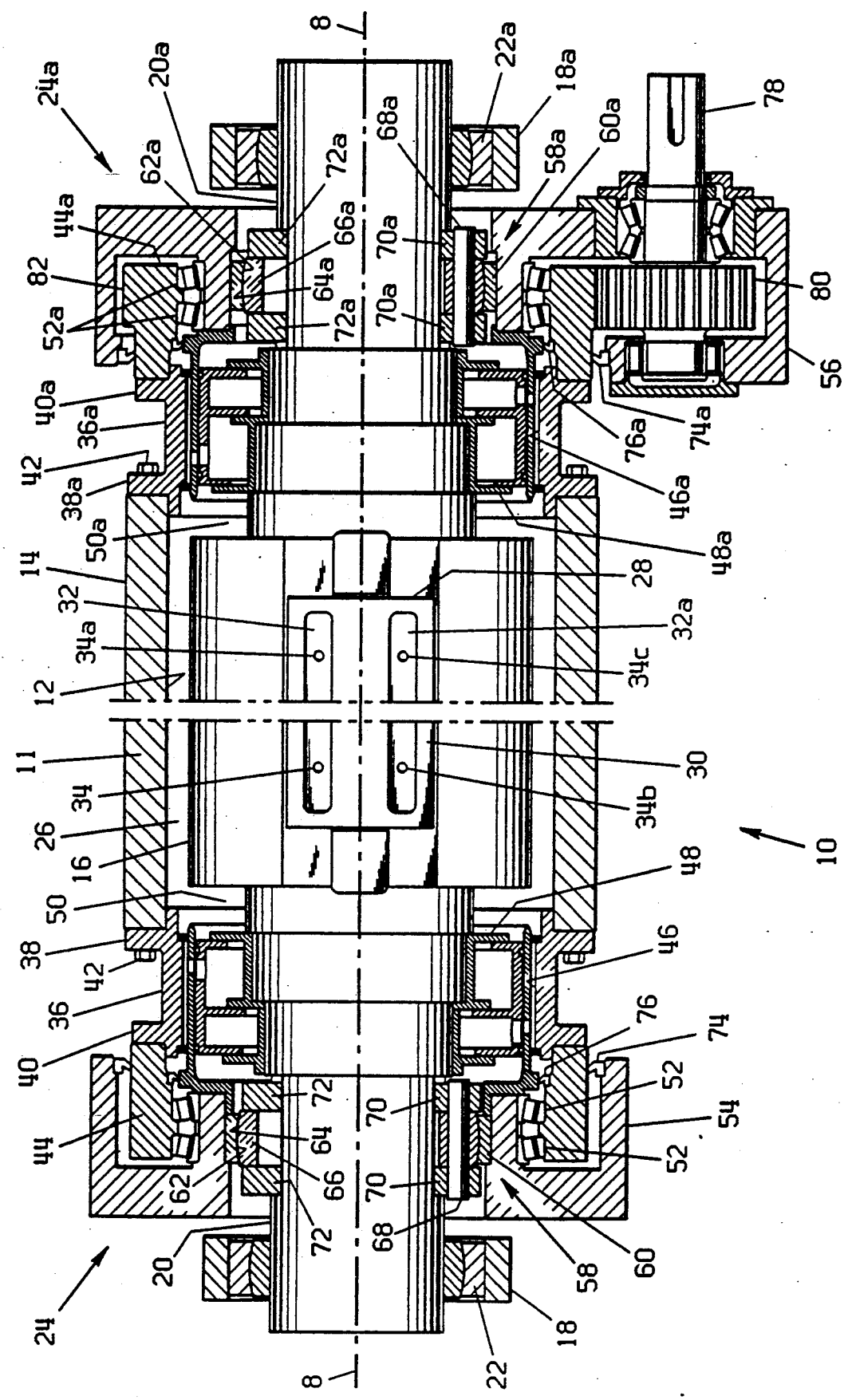
FIG. 1 is a plan view of the self-loading controlled deflection roll, with the roll shell broken away and the bearing housing and gear box are in section for clarity, showing a drive connected to a gear box on the back end of the roll.

As shown in FIG. 1, a controlled deflection roll, generally designated with numeral 10, has a hollow, cylindrical roll shell 11 which, by definition, has an inner, cylindrical surface 12 and an outer, cylindrical surface 14. A support shaft 16 extends through the roll shell and is mounted on a support means, such as a mounting stand 18,18a at either end with stub arbors 20,20a in a spherical bushing 22,22a at the front and rear ends 24,24a, respectively, of the roll. In this description, similar structural elements are similarly numbered but are identified with different alphabetical suffixes.

The support shaft 16 defines, with the inner wall surface 12 of the roll shell, a space 26. In other words, space 26 represents a radially extending gap between the support shaft and the inner surface of the roll shell. A means for supporting the roll shell relative to the support shaft, such as an elongate support shoe 28, is mounted on the roll shaft and is supported against the roll shaft to provide deflection correcting force against the inner surface 12 of the roll shell.

Figure 2:
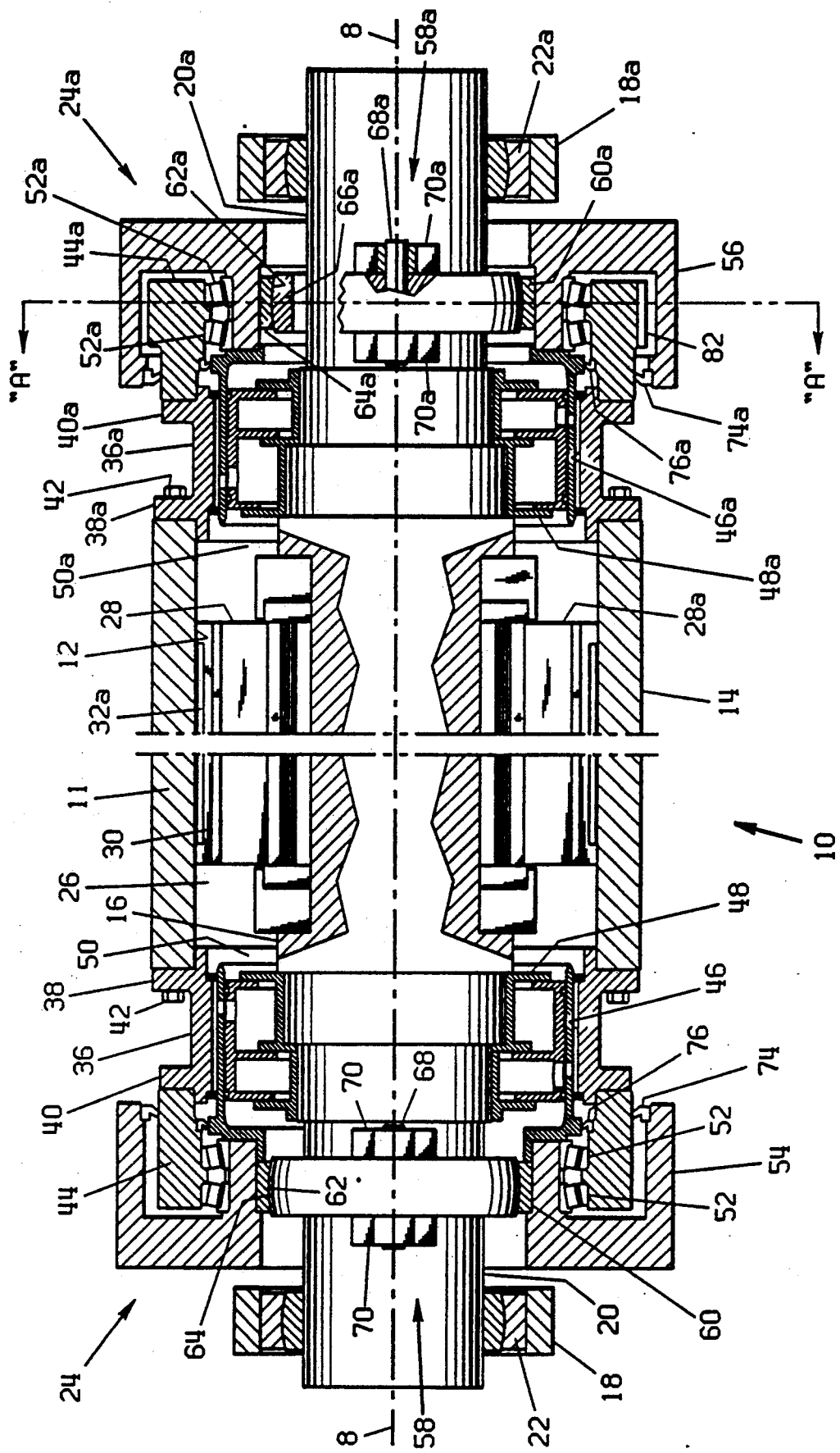
FIG. 2 is a side view of the roll shown in FIG. 1. The roll shell is also broken away and the bearing housing and gear box are in section for clarity and to show the pivot assembly.

A corresponding support shoe 28a is mounted on the support shaft and is supported against the roll shaft to support and move the roll shell in the diametrically opposite direction to that of support shoe 28. This is shown in FIG. 2. Thus, in the convention shown in FIGS. 2, 3 and 3A, support shoe 28 supports the roll shell and moves the roll shell upwardly into nipping engagement N with a mating roll 6. Support shoe 28a moves the roll shell downwardly away from the roll shaft and opens the nip with the mating roll. The manner in which the shoe is hydraulically actuated in the support shaft 16 is well-known in the art and does not per se constitute the invention. Consequently, it will not be shown or described in more detail. This operation, for example, is shown and described in U.S. Pat. Nos. 4,821,384 and 4,850,088, which are commonly assigned with this invention, the disclosures of which are incorporated herein by reference. For the purposes of this invention, it is sufficient to disclose that the support shoe 28 is actuated by hydraulic fluid which is introduced into the support shaft to a location beneath the support shoe to pressurize the support shoe against the inner surface of the roll shell and to provide lubrication at the interface between the curved surface of the shoe face 30 and the inner surface 12 of the roll shell. Such lubrication is typically provided either by leading pressurized hydraulic fluid upwardly into one or more pockets 32,32a through one or more throttling lubrication conduits 34,34a,34b,34c in the face 30 of the shoe.

The shoe, which can take the form of a plurality of circumferentially and/or longitudinally spaced or abutting shoe segments, is arrayed to extend longitudinally in the support shaft in the direction of the longitudinal axis 8 of the roll 10.

At either end of the roll shell is an extension piece 36,36a which comprises a substantially hollow cylinder with a radially extending flange 38,38a and 40,40a at either end. One end of each extension piece is bolted by its flange 38,38a to the corresponding end of the roll shell with bolts 42. The other end flange 40,40a of each extension piece is bolted to a hollow, cylindrical bearing portion 44,44a of the extension pieces. The extension pieces and bearing portions extend axially outwardly from the ends of the roll shell. The inner wall 46,46a of the extension pieces are concentric with the inner wall 12 of the roll shell.

Intermediate the extension pieces and a necked-down portion of the support shaft is a barrier seal 48,48a which provides a heat shield and fluid barrier between a cavity 50 within the roll and the exterior of the roll. Cavity 50 is defined by these barrier seals 48,48a, the inner surface 12 of the roll shell and the roll support shaft 16. Essentially, the cavity 50 is the space 26 which is limited at either end by barrier seals 48,48a.

Figure 3A:
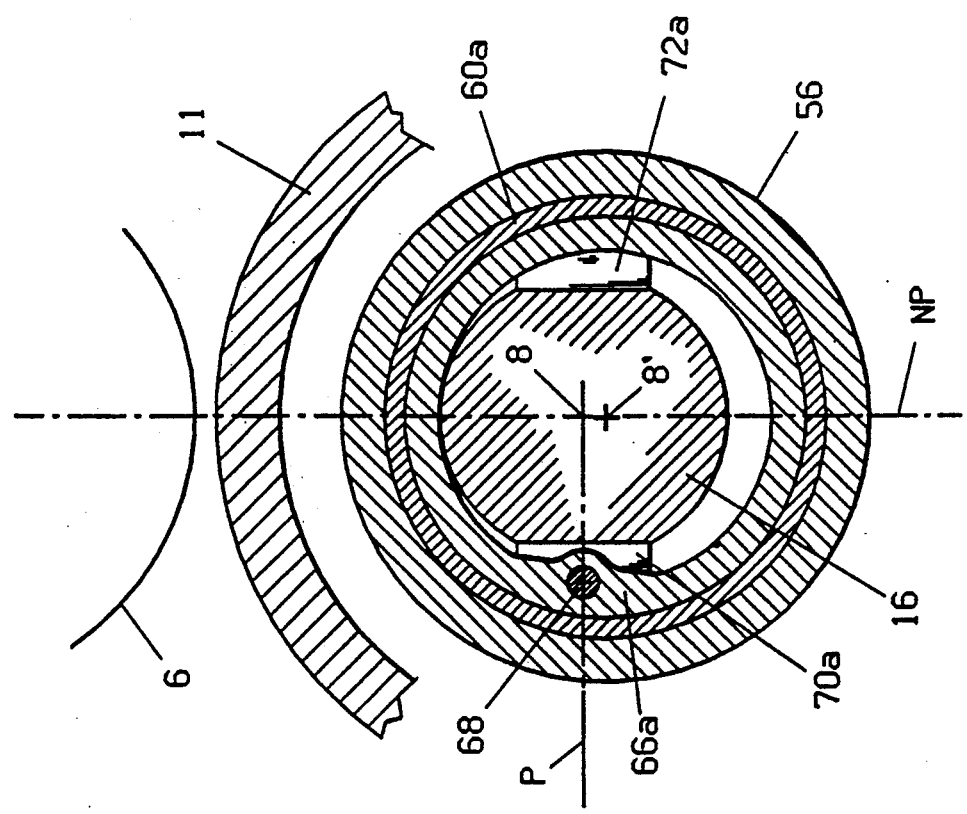
FIG. 3A is a view similar to that shown in FIG. 3, but with the inner ring pivoted downwardly to open the nip between the controlled deflection roll and a mating roll.
Figure 3:
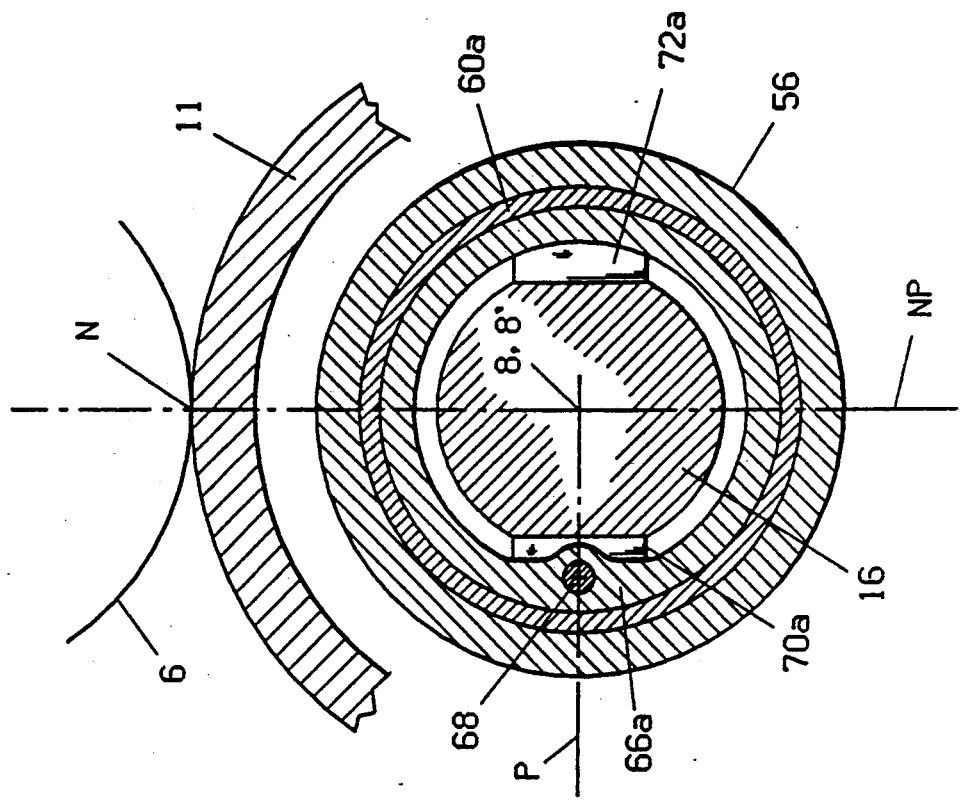
FIG. 3 is an end view taken through section "A'-'—"A" of the roll shown in FIG. 2. The bearings and bearing housing have been omitted for clarity.

With particular reference to FIGS. 1, 3 and 3A, a pair of non-self-aligned bearings 52,52a are mounted between the bearing portions 44,44a and a bearing housing 54 on the front end of the roll and a gear box 56 on the rear of the roll. If the roll 10 is non-driven, the gear box on the back of the roll is replaced by an ordinary bearing housing, such as bearing housing 54, on the front of the roll. The non-self-aligned bearings provide rotational support of the roll shell, through the extension pieces and bearing portions, in the bearing housing 54 and gear box 56. The non-self-aligning bearings ensure that there is no skewing motion between the bearing housing and roll shell transaxially relative to the longitudinal axis 8' of the roll. By transaxially, it is meant rotation or movement about an axis at right angles to the longitudinal axis 8.

The manner in which the bearing housing 54 and gear box 56 are mounted relative to the support shaft 16 is the same at either end of the roll, so the description will only be with respect to the front end. Corresponding elements are correspondingly numbered with different alphabetical letter suffixes. The bearing housing 54 is pivotally mounted to the support shaft by a pivot assembly, generally designated with the numeral 58, which includes a spherical bushing 60 mounted in the bearing housing and which has a concave spherical surface 62 receiving a similarly curved convex spherical surface 64 on an inner ring 66 which is pivotally mounted to the support shaft by a pin 68 extending between a pair of pivot blocks 70,70a. The pin 68 is parallel with the longitudinal axis 8 of the roll.

In operation, the hydraulic actuation of the upper and lower support shoes 28,28a to move the roll shell into, and out of, nipping engagement with mating roll 6, and the lubrication of the interface between the inner surface of the roll shell and the shoe face of each of the support shoes creates heat in the hydraulic fluid introduced into the roll. In papermaking processes requiring a hot controlled deflection roll surface, the hydraulic fluid itself can be heated externally of the roll to be introduced into the roll for the purpose of heating the roll shell. This heat can also be provided by induction heating of the roll shell. This heat is created or provided regardless of whether the interfaces are lubricated and supported hydrodynamically or hydrostatically, which are the two forms of operation for all controlled deflection rolls. The hot hydraulic fluid which passes off the trailing side of the support shoes collects in the cavity 50 of the roll and is prevented from migrating axially outwardly from beneath the roll shell by the barrier seals 48,48a beneath the extension pieces at either end of the roll shell. Suitable means, which is not shown and which is well-known in the art, such as a sump pump, collects the hot hydraulic fluid and directs it axially out of the roll through one end of the support shaft for eventual recirculation back into the roll.

Under the impetus of the hydraulically actuated shoes 28,28a, the roll shell is pivoted about pivot pins 68,68a which are fixedly mounted to the support shaft in each pair of pivot blocks 70,70a. The bearing housing at one end and the gear box at the other end are supported on their respective spherical bushings 60,60a which, in turn, are supported by the inner rings 66,66a at either end of the roll. The cooperating spherical surfaces 62,64 on the spherical bushing and inner ring, respectively, together with the inner ring, pivot pin, pivot blocks and a ring guide 72, comprise a pivot assembly 58 for guiding and supporting the bearing housings, or a bearing housing at one end of the roll and a gear box at the other end of the roll, for translational movement radially outwardly relative to the support shaft and longitudinal axis 8 of the roll, into, and out of, nipping engagement with the mating roll. The translational movement is, therefore, substantially in a nip plane extending between the nip N, between the roll shell and the mating roll, and the longitudinal axis 8. The ring guides 72,72a at either end of the roll are fixedly mounted to the support shaft on either side of the inner ring to guide the inner ring in its translational movement about its pivot pin.

While the pivot pin guides the inner ring and roll shell in a pivoted, arcuate path relative to the support shaft, the result of this movement is that the center of the inner ring, the bearing housing, the roll shell support bearings and the roll shell are all translationally moved radially relative to the longitudinal axis of the roll. In other words, when the nip is open, as shown in FIG. 3A, the center 8' of the inner ring and roll shell is offset from the longitudinal axis 8 of the roll. When the rolls 10,6 are nipped together, as shown in FIG. 3, the center 8' of the inner ring and roll shell is concentric with the longitudinal axis 8 of the roll. This is shown concentric, but the nipped condition could be effected with the axes 8,8' in non-concentric configuration.

As shown in FIG. 3, the pin plane P through the pin 68 and axis 8 is substantially perpendicular (i.e. 90°) to the nip plane NP which extends through the nip N and axis 8.

The non-self-aligned bearings 52,52a are secured in the bearing housings, or bearing housing and gear box, to permit rotation of the roll shell, extension pieces and bearing portions relative to the bearing housings, or bearing housing and gear box. Since the bearings 52,52a are of the non-self-aligned type, there can be no transaxial movement of the roll shell, extension pieces or bearing portions relative to the bearing housings, or bearing housing and gear box. Any deflection of the roll shell relative to the support shaft is accommodated by the interface of the spherical surfaces 62,64 in the pivot assemblies at either end of the roll. The non-self-aligned bearings rotatably supporting the roll shell can, therefore, be more effectively sealed by seals 74,74a between the bearing housings, or bearing housing and gear box, and the bearing portion extending from the extension pieces. Similar seals 76,76a extend between the bearing portions and the barrier seals.

In the preferred embodiment, the non-self-aligned bearings rotatably supporting the roll shell are mounted in the roll at, or substantially near, a position radially outside of the inner rings and their pivoted supports. The weight and nip loading forces of the roll shell is thereby more evenly distributed upon the inner rings and pivot pins. The roll shell support bearings are also axially outside of the barrier seals and the ends of the roll shell. The barrier seals thus provide both a heat barrier and a liquid seal between the cavity, in which the hot hydraulic fluid is collected, and the roll shell support bearings 52,52a. This prevents the hot hydraulic fluid used to actuate and lubricate the support shoes from contacting and excessively heating the lubricant used to lubricate the non-self-aligned roll shell support bearings.

As shown in FIG. 1, when it is desired to drive the self-loading controlled deflection roll, a drive shaft 78 having a pinion 80 is rotatably mounted in the gear box to engage a drive gear 82 which is formed on the bearing portion 44a. When a motor, not shown, is connected to the drive shaft 78, pinion 80 drives gear 82 which is connected to the roll shell through the bearing portion 44a and extension piece 36a to rotatably rotate the roll shell. The drive shaft is rigidly secured to the gear box which, as explained previously, is rotationally mounted relative to the roll shell, but transaxially rigid relative to the roll shell due to the non-self-aligned bearings.

Naturally, variations in the specific embodiments disclosed by way of example can be made without departing from the spirit and teaching of the invention described. Such variations, as will readily occur to those skilled in the art, are intended to be within the scope of the claims.

What is claimed is:

1. A self-loading type of controlled deflection roll comprising, in combination:
   a support shaft having a longitudinal axis;
   a roll shell having inner and outer surfaces disposed about the support shaft and defining, with the support shaft, a space therebetween;
   support shoe means mounted against the support shaft and extending into the space to engage the inner surface of the roll shell to support the roll shell about the support shaft and to move the roll shell translationally relative to the support shaft;
   roll shell extension means attached to the roll shell at either end thereof, extending axially outwardly from each end of the roll shell, and further extending the space between the support shaft and roll shell;
   bearing means, including a bearing housing for mounting non-self aligned bearings, for rotatably supporting the roll shell extension means at either end of the roll shell;
   pivot assembly means for supporting the bearing means near either end of the roll, and pivotally mounted to the support shaft for mounting the bearing means pivotally for translational movement relative to the longitudinal axis of the support shaft, said pivot assembly means including bushing means intermediate the bearing means and the support shaft for accommodating transaxial skewing of the roll shell relative to the support shaft;
   heat barrier means disposed about the support shaft axially outside of the roll shell beneath the roll shell extension means and in the space between the support shaft and roll shell near either end of the roll shell, said heat barrier means defining, with the support shaft and roll shell, an interior cavity extending inwardly in the space from the heat barrier means at either end of the roll shell;
   said heat barrier means disposed intermediate the cavity and the bearing means.

2. A self-loading type of controlled deflection roll as set forth in claim 1, wherein:
   the pivot assembly means includes an inner ring pivotally mounted to the support shaft;
   the bearing means includes a bearing housing which is supported by the inner ring.

3. A self-loading type of controlled deflection roll as set forth in claim 2, wherein:
   the pivot assembly means includes a ring guide mounted to the support shaft for guiding the inner ring movement transversely relative to the longitudinal axis.

4. A self-loading type of controlled deflection roll as set forth in claim 2, wherein:
   the roll shell extension means includes a bearing support portion extending axially outside of the roll shell extension means attached to the roll shell;
   the bearing means includes non-self-aligned bearings, said bearings mounted in the bearing housing and rotatably supporting the bearing support portion in the bearing housing.

5. A self-loading type of controlled deflection roll as set forth in claim 2, wherein:
   the bushing means includes a spherical bushing mounted intermediate the inner ring and the bearing housing for permitting relative movement between the roll shell and support shaft transaxially of the longitudinal axis.

6. A self-loading type of controlled deflection roll as set forth in claim 2, wherein:
   the pivot assembly means is disposed axially outside of the heat barrier means at either end of the roll.

7. A self-loading type of controlled deflection roll as set forth in claim 6, wherein:
   the pivot assembly means supports the bearing means at a location substantially radially inwardly from the bearing means.

8. A self-loading type of controlled deflection roll as set forth in claim 1, further including:
   a drive means including a gear box near one end of the roll, the gear box mounting the non-self-aligned bearings at the said one end of the roll;
   the drive means comprising a drive shaft, a pinion secured to the drive shaft, and a drive gear on the gear box over the bearings, said pinion engaging the drive gear.

* * * * *